United States Patent [19]
Kamijo

[11] Patent Number: 5,166,918
[45] Date of Patent: Nov. 24, 1992

[54] LOADING MECHANISM FOR DISK CARTRIDGES WITH VIBRATION REDUCING MECHANISM

[75] Inventor: Noriyuki Kamijo, Suwa, Japan

[73] Assignee: Seiko Epson Corporation, Tokyo, Japan

[21] Appl. No.: 523,691

[22] Filed: May 15, 1990

[30] Foreign Application Priority Data

| May 15, 1989 | [JP] | Japan | 1-120721 |
| May 18, 1989 | [JP] | Japan | 1-124742 |
| May 18, 1989 | [JP] | Japan | 1-124745 |

[51] Int. Cl.⁵ .................. G11B 33/02; G11B 17/00; G11B 21/16; G11B 17/04
[52] U.S. Cl. .................. 369/77.1; 369/247; 360/99.06
[58] Field of Search .......... 369/77.1, 77.2, 75.2, 369/75.1, 270, 271, 247; 360/99.06, 99.07, 99.02, 99.03, 96.5, 96.6, 133

[56] References Cited

U.S. PATENT DOCUMENTS

| 4,360,907 | 11/1982 | Yamamura | 369/77.2 X |
| 4,384,352 | 5/1983 | Saito et al. | 369/77.2 |
| 4,509,158 | 4/1985 | Kang | 369/77.2 |
| 4,703,470 | 10/1987 | Castagna et al. | 369/247 |
| 4,719,526 | 1/1988 | Okita et al. | 360/99.06 X |
| 4,723,185 | 2/1988 | Maeda | 360/99.07 X |
| 4,737,945 | 4/1988 | Yamazaki et al. | 369/75.2 |
| 4,758,909 | 7/1988 | Harase | 360/99.06 X |
| 4,794,478 | 12/1988 | Kamezawa et al. | 360/96.6 |
| 4,811,138 | 3/1989 | Park | 360/96.6 |
| 4,945,433 | 7/1990 | Suzuki et al. | 360/99.07 |
| 5,067,121 | 11/1991 | Einhaus | 360/99.07 |

FOREIGN PATENT DOCUMENTS

| 62-246167 | 10/1987 | Japan | 360/96.6 |
| 2267792 | 11/1990 | Japan | 369/247 |

Primary Examiner—John W. Shepperd
Assistant Examiner—Michael C. Kessell
Attorney, Agent, or Firm—Blum Kaplan

[57] ABSTRACT

A loading mechanism for a data storage device is provided in which the data storage device is housed in a cartridge. The loading mechanism includes a mounting frame. A holder is mounted on the frame and receives and maintains the cartridge in place. A chassis is mounted on the mounting frame so that when the cartridge is loaded, the holder and the chassis move in opposite directions relative to the mounting frame.

13 Claims, 10 Drawing Sheets

LOADING MECHANISM FOR DISK CARTRIDGES WITH VIBRATION REDUCING MECHANISM

BACKGROUND OF THE INVENTION

The present invention relates to loading mechanisms which load and eject data storage media from the host unit, and in particular, to loading mechanisms which operate on cartridges such as disks which house the data storage media.

Figure 5:
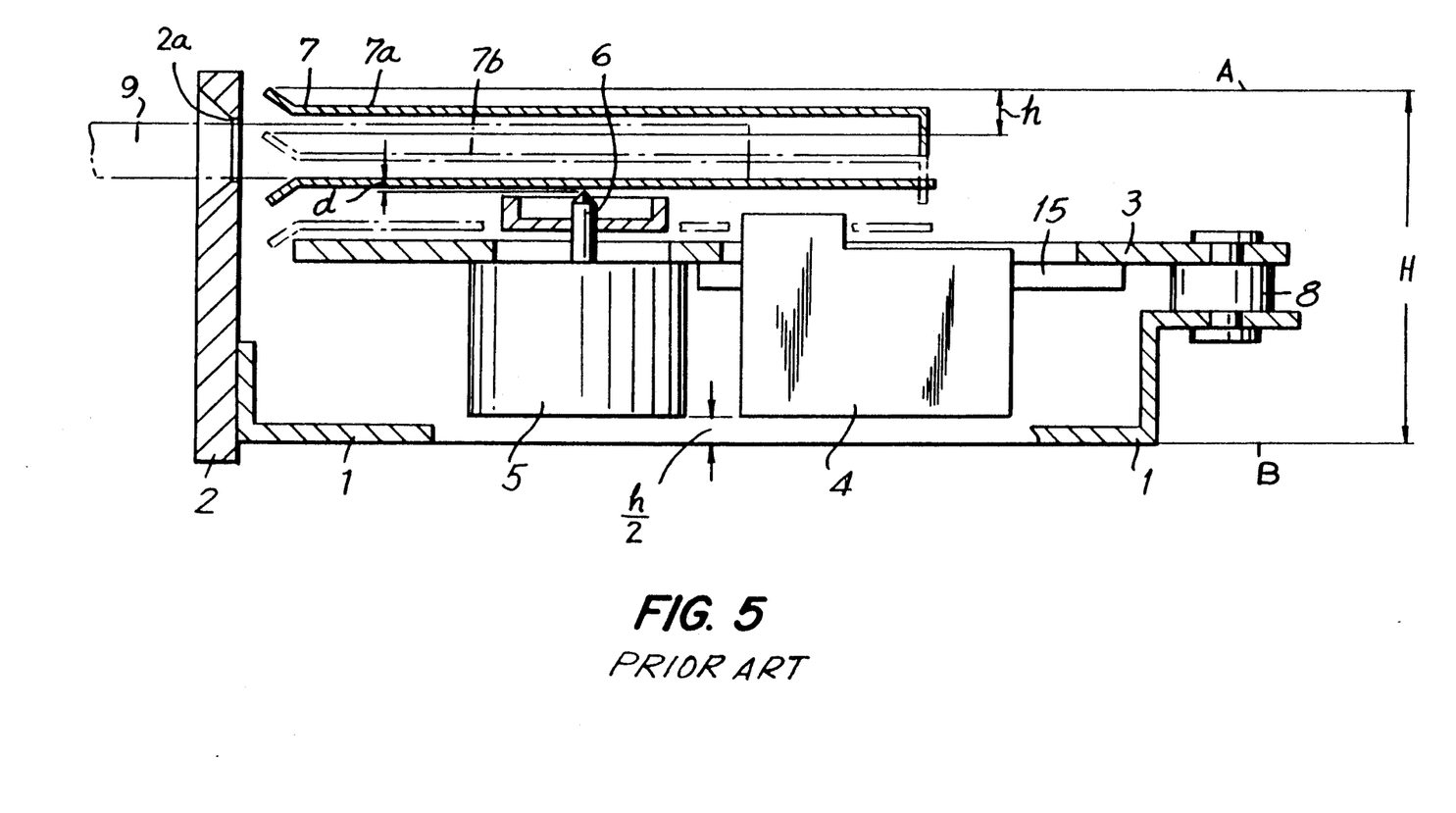
FIG. 5 is a partial cross-sectional view of a loading mechanism constructed in accordance with the prior art.

Loading mechanisms for storage data devices are known in the prior art. One such conventional loading mechanism is shown in FIG. 5. Such a loading mechanism may be utilized for loading floppy disk drives or optical disk drives. The mechanism includes a mounting frame 1 which mounts a data storage device within a host unit such as a personal computer or the like. A bezel 2 secured to mounting frame 1 is provided with a window 2a therein.

A main chassis 3 is mounted on frame 1. A guide rail 15 is supported on main chassis 3. A head 4 supported on guide rails 15 moves along guide rails 15 in the radial direction of the disk to perform seek operations along the disk. A spindle motor 5 mounted on chassis 3 is coupled to a spindle 6. A holder 7 holds the cartridge 9 therein. Holder 7 moves in the vertical direction of FIG. 5 within a space interval defined by position 7a and position 7b shown in phantom. Rubber vibration insulators 8 are disposed between mounting frame 1 and main chassis 3. Vibration insulators 8 absorb the vibration or shock of mounting frame 1 so that the shock or vibration is not transmitted to spindle motor 5, head 4 or other precision members of the disk operating portion of the data storage device.

A distance H extending from a top plane A of holder 7 to bottom plane B of mounting frame 1 represents the height of the data storage device. H is a generally standardized height determined for data storage devices. This height H is also utilized in conjunction with the invention.

During operation of the storage device, its power source is powered on. Cartridge 9 is then inserted through window 2a of bezel 2. In the prior art device, when no cartridge 9 is inserted, holder 7 is at position 7a with respect to main chassis 3. This is a commonly used configuration known in the prior art. As can be seen, the top of spindle 6 is separated from the bottom of holder 7 by a distance d. Therefore, when cartridge 9 is inserted, the bottom surface of cartridge 9 and the top of spindle 6 do not interfere with each other allowing smooth insertion of cartridge 9.

When cartridge 9 is completely within holder 7, holder 7 moves down to position 7b through an operation commonly used and well known in the art. When holder 7 moves, it follows that cartridge 9 also moves down and the disk which serves as the data storage medium within cartridge 9 is securely clamped at a prescribed height while maintaining concentricity with spindle motor 5. When cartridge 9 is inserted into holder 7, a shutter provided on holder 7 is opened so that a part of the disk inside the cartridge is exposed. A guide plate or iron, having a central bore is fixed to the exposed portion of the disk, in particular to the center of the disk. Therefore, as the cartridge starts to move downward, the guide plate is magnetically attracted by a permanent magnet of the spindle motor inside the turntable. The level of the attracting force increases as the cartridge is lowered. Even if there is a slight offset of the center of the disk from the center of the spindle 6, the disk is automatically centered and aligned with the center of spindle 6 since the disk hole is guided by the tapered guide surface on the end of spindle 6. A further downward movement of holder 7 increases the level of the magnetic attraction force so that the disk is brought into contact at its lower side with the top surface of the turntable, whereby the clamping of the disk is completed. Once the disk is clamped, spindle motor 5 begins rotating and head 4 is able to read information from or write information onto the disk either magnetically or optically through commonly used operations well known in the art.

If the entire data storage device is subjected to vibration or shock during a read or write operation, mounting frame 1 receives the vibration or shock. However, rubber vibration insulators 8 act as dampeners to prevent this vibration or shock from being transmitted to main chassis 3. Therefore, spindle motor 5, head 4 and the other precision members supported on main chassis 3 are not affected. For this reason, the data storage device operates normally even when subjected to vibration or shock during the read or write operation.

Cartridge 9 is ejected through a ejection button triggering mechanism known in the art. When this is done, holder 7 returns from position 7b to position 7a. Simultaneously, with the start of the rise of holder 7, cartridge 9, which has been lowered, starts to be lifted by holder 7 so that cartridge 9 lifts the clamped disk away from the turntable against the magnetic attracting force produced by spindle motor 5. The disk is then further raised together with cartridge 9. This separates the disk from spindle 6 by a gap d. The disk is ejected from the data storage device together with cartridge 9. In this state, the shutter on cartridge 9 is closed by a mechanism which is well known in the prior art, whereby the disk is completely covered by the shutter and the body of the cartridge.

The prior art apparatus has been satisfactory. However, when a cartridge 9 is inserted within the data storage device, there is a gap d between cartridge 9 and the top end of spindle 6. Therefore, the distance cartridge 9 and holder 7 travel from position 7a where the cartridge starts to move until the disk is clamped at position 7b by spindle motor 5 is normally about 5 mm. When vibration or shock is applied to the data storage device, rubber vibration insulators 8 flex resulting in vertical and/or horizontal displacement of main chassis 3, spindle motor 5, head 4 and other precision members mounted on main chassis 3. The amount of displacement is normally 2 to 3 mm, equaling about one half of the travel path.

The space above plane A and the space below plane B are spaces which must be utilized by the host unit (the personal computer or the like) in which the data storage device is utilized. Because component parts of the host unit are located within the spaces, no element of the data storage device may go beyond plane A or plane B even when there is vibration or shock. The height H must not be exceeded. Therefore, the prior art devices are constructed with a gap h having a height of 5 mm between plane A and the top of holder 7 at the position 7b. Additionally, a small gap h/2 is preserved between the plane B and the spindle motor or between the plane B and head 4. h/2 has a value of 2 to 3 mm which is large enough to prevent the bottoms of the spindle motor and head 4 from colliding with elements when the bottoms have projected downward beyond the bottom of the mounted frame in the event of the application of an external impact force during reading and writing operations. However, as discussed above, 2 to 3 mm must be provided for sufficient displacement clearance so space is wasted above holder 7. This must be counterbalanced with the standard height of the data storage device H even when holder 7 is at the upper position 7a, thus making it necessary to design cartridge 9, spindle motor 5, head 4 as well as other devices to be thinner to allow for this wasted space. This adversely affects the reliability of the data storage device. On the other hand, if too much emphasis is placed on the reliability, the size of the data storage device will unavoidably increase becoming larger than the standard height H. Accordingly, it is desired to provide a loading mechanism for data storage devices which minimizes the amount of wasted space without sacrificing reliability.

SUMMARY OF THE INVENTION

Generally speaking, in accordance with the invention, a loading mechanism for a data storage device includes a mounting frame, a main chassis mounted on said mounting frame, and a holder for receiving a cartridge mounted on the chassis so that when the data storage device loads the cartridge, the main chassis and holder are displaced in opposite directions relative to each other.

In one embodiment of the invention, the main chassis, holder, and mounting member are linked by a plurality of linkage levers. The holder and main chassis move relative to each other. Additionally, the movement of the main chassis and holder is in opposite directions with respect to the mounting member. The vibration isolation member is disposed between the mount means and the main chassis or between the mount means and the holder in order to absorb vibration and input which may be generated in or applied externally during operation of the information recording apparatus or during suspension of operation of the apparatus. When the vibration insulator is disposed between the mounting member and the main chassis the vibration insulator is utilized for raising and lowering the holder relative to the chassis and is displaced with respect to the mounting member utilizing a belt.

The vibration insulator may also be displaced with respect to the mounting member so that the vibration insulator flexes or slides with respect to the mounting member. The vibration insulator may be displaced with respect to the mounting member by driving the belt and the main chassis or holder may be displaced when the cartridge is loaded in the data storage device, the belt being mounted about the periphery of the main chassis.

Accordingly, it is an object of the invention to provide an improved loading mechanism for a data storage device.

Yet another object of the invention is to provide a load mechanism for data storage devices which are of a more compact and thinner construction while improving overall reliability by providing a main chassis supporting a spindle motor which is displaced relative to the cartridge when the cartridge is inserted and/or rejected from the loading mechanism.

A further object of the invention is to provide a loading mechanism for a data storage device in which no space is wasted, allowing the space to be utilized by the spindle motor, head and other driving components.

Still other objects and advantages of the invention will in part be obvious and will in part be apparent from the specification.

The invention accordingly comprises the features of construction, combination of elements and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Reference is first made to FIGS. 1–4 in which a loading mechanism for a data storage device, generally indicated as 100 and constructed in accordance with the invention is provided. Loading mechanism 100 includes a mounting frame 101 for securing loading mechanism 100 to a host unit such as a personal computer or the like. A pair of linkage levers 110 are secured at opposed sides of mounting frame 101 so that four linkage levers 110 are secured to mounting frame 101 by pins 1 21 and 124 respectively. Pins 121 and 124 are positioned at the center of rotation of each linkage lever 110. A bezel 102 is secured to mounting frame 101 and is formed with a window 102a therein. A main chassis 103 is mounted on mounting frame 101. Linkage levers 110 are secured at the sides of main chassis 103 by pins 122 and 125 respectively so that linkage lever 110 may rotate about pins 122, 125.

Figure 1:
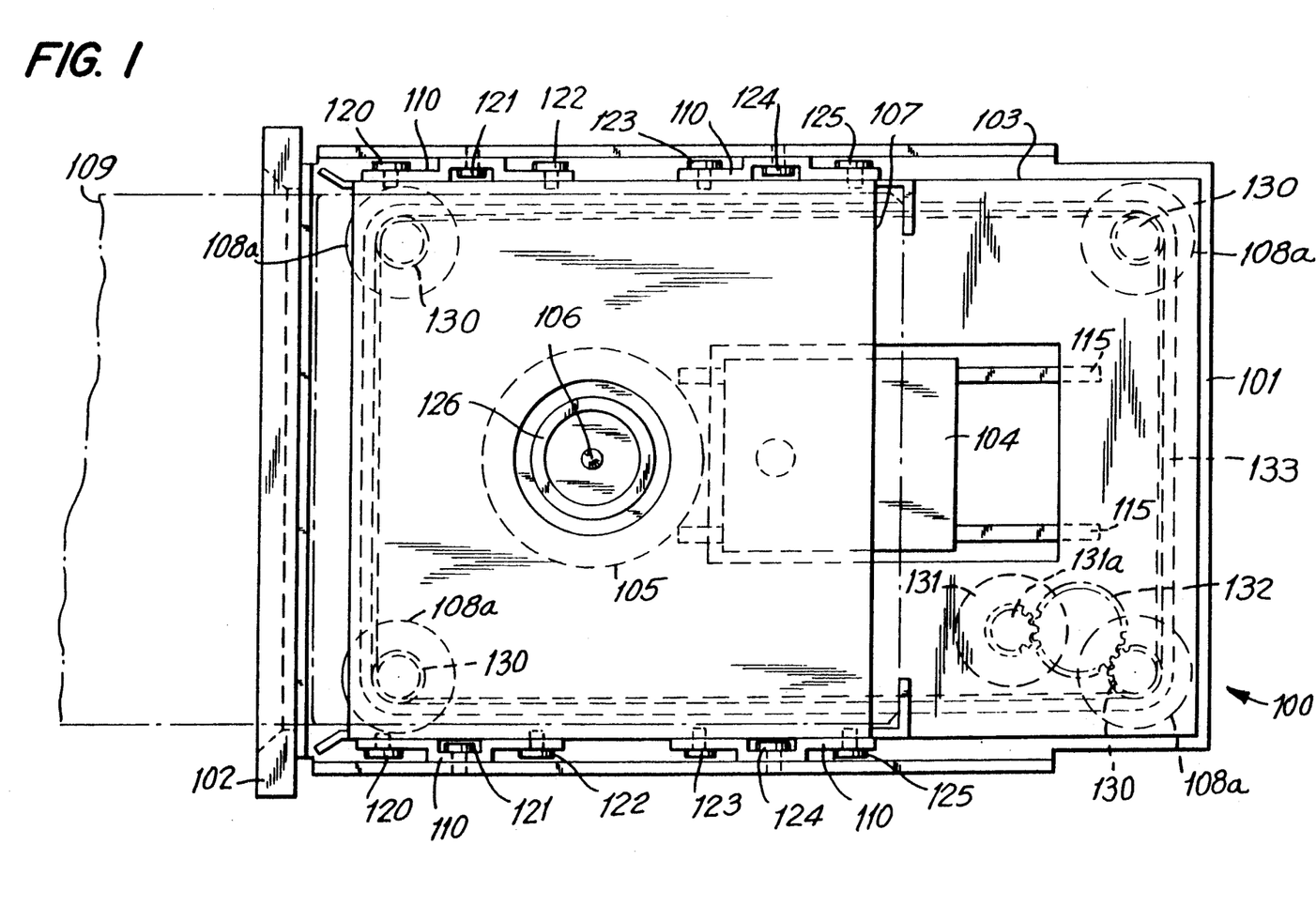
FIG. 1 is a top plan view of a loading mechanism for storage device constructed in accordance with the invention.
Figure 2:
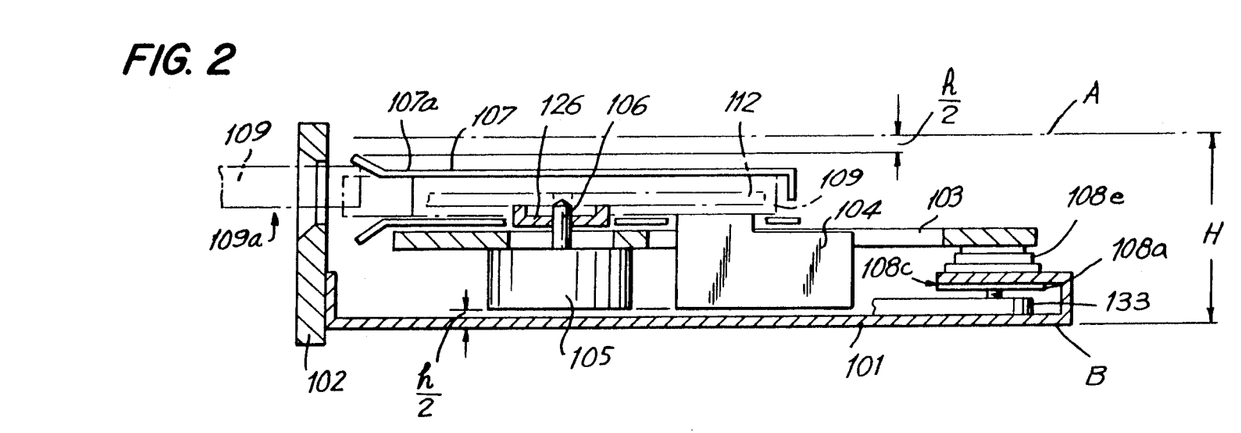
FIG. 2 is a sectional schematic view illustrating loading of a cartridge in accordance with the invention.

A spindle motor 105 for driving the disk is supported on main chassis 103. Spindle motor 105 includes a spindle 106 projecting therefrom and a spindle hub 126. A pair of guide rails 115 are supported on chassis 103 parallel to each other. A head 104 operating in a conventional magnetic or optical manner is supported on guide rails 115.

A holder 107 receives a cartridge 109 inserted through window 102a. Cartridge 109 includes a disk 112 therein which acts as the data storage medium. Linkage levers 110 are coupled to holder 107 by pins 120 and 123 so that linkage levers 110 may rotate thereabout. Holder 107 is capable of moving between an upper position 107b (FIG. 4) and a lower position 107a (FIG. 2). When in position 107a, head 104 works in conjunction with disk 112 to read the data from or write data on disk 112 utilizing a conventional optical or magnetic means.

Rubber vibration insulators 108a are positioned between mounting frame 101 and main chassis 103. Four vibration insulators 108a are positioned at the corners of main chassis 103. However, for simplicity, a single vibration insulator 108a is described by way of example. Rubber vibration insulators 108a function not only as vibration insulators which prevent shock or vibration from being transmitted to main chassis 103 when data storage device 100 is subjected to shock or vibration, but also to slide down when main chassis 103 is to move in a downward direction.

Figure 3:
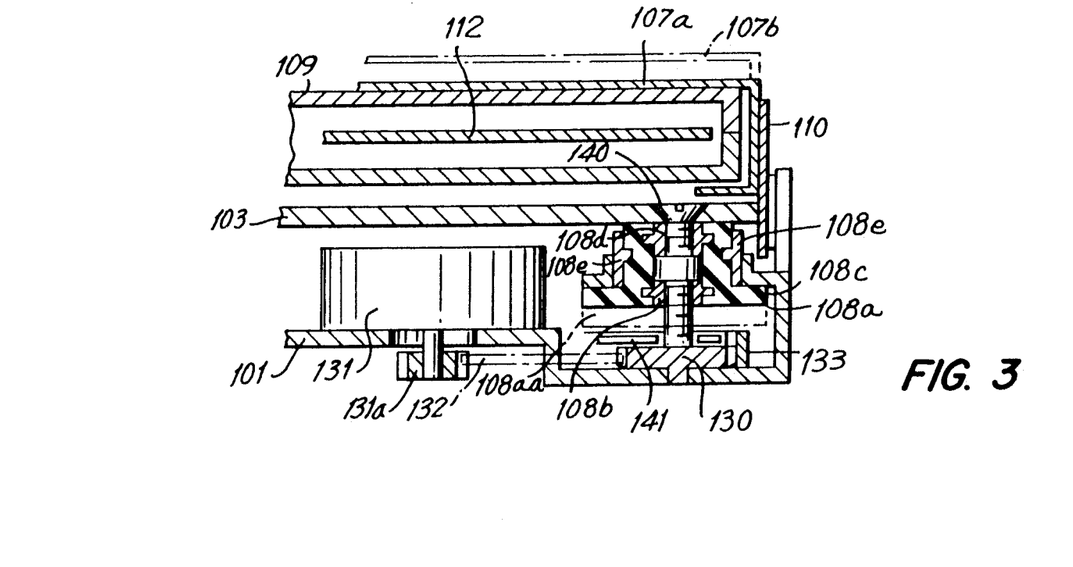
FIG. 3 is an enlarged sectional view of a rubber vibration insulator of FIG. 2.

As seen is FIG. 3, rubber vibration insulator 108a is inserted in a cylinder 108e. Bushings 108b and 108d are inserted in the inner circumference of rubber vibration insulator 108a. The middle of bushings 108b and 108d have a female thread. A lift gear 130 is also located at each corner of mounting frame 101. A threaded part of lift gear 130 engages a main chassis 103 via bushings 108b, vibration insulator 108a and bushings 108d and lock screw. As seen in FIG. 1, a single lift gear 130 is coupled through an intermediate gear 132 to a pinion 131a of a lift motor 131 mounted on mounting frame 101 and to each other lift gear 130 by a gear belt 133 which extends about the periphery of main chassis 103.

When cartridge 109 is inserted in the loading mechanism 100 from a position 109a indicated in FIG. 2, the leading edge of cartridge 109 contacts a detection switch within the data storage device causing lift motor 131 to begin rotation. The rotation of lift motor 131 causes pinion 131a to rotate lift gear 130 through intermediate gear 132. The rotation is transmitted to each lift gear 130 by a geared belt 133 which rotates the remaining lift gears 130. When each lift gear 130 rotates, the threaded portion of lift gear 130 rotates. The threaded portion of lift gear 130 engage bushing 108b. Lift gears 130 are depressed in place by a plate 141 causing lift gears 130 to pull on bushing 108b while remaining in position.

Bushings 108b are secured to rubber vibration insulators 108a so that there is a downward pull on rubber vibration insulators 108a. Rubber vibration insulators 108a are inserted in cylinders 108e. In turn, cylinders 108e are inserted within cylinder like guides on mounting frame 101. There is only a small amount of play within mounting frame 101 and cylinders 108e so that rubber vibration insulators 108a move down to position 108aa (FIG. 3) from beginning position 108c. Because main chassis lock screws 140 engage bushing 108d, when rubber vibration insulators 108a move down, main chassis 103 along with spindle motor 105 and head 104 secured to main chassis 103 are displaced in the same direction. This displacement causes linkage levers 110 to rotate about pins 121 and 124 at their respective centers of rotation. This rotation causes holder 107 to rise to position 107b as linkage levers 110 also rotate about pins 120 and 123. This is due to the parallel configuration provided by the four linkage levers 110.

Figure 4:
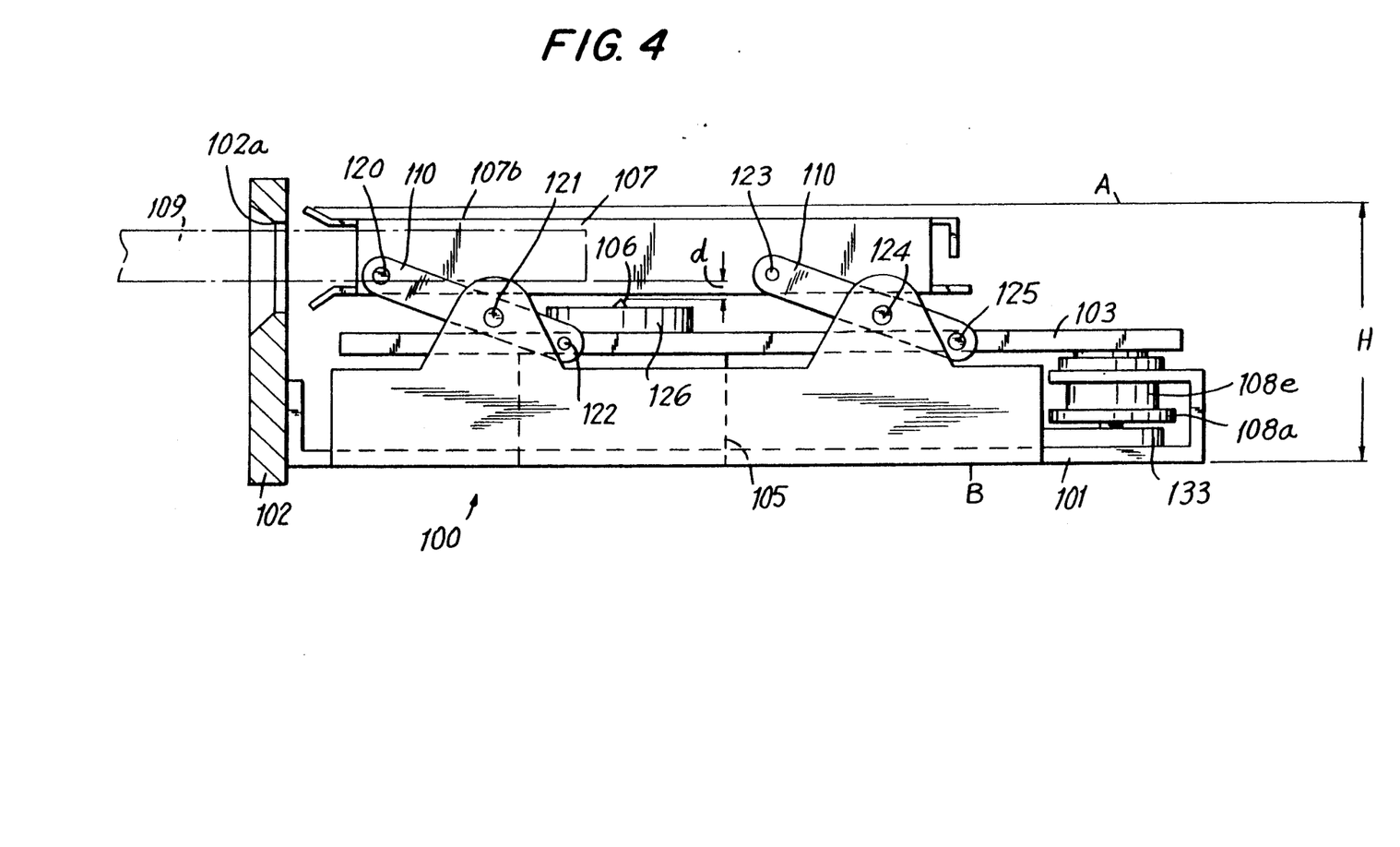
FIG. 4 is partial cross-sectional view of the loading mechanism for the data storage device showing a cartridge being inserted into the loading mechanism constructed in accordance with the invention.

By setting the appropriate distance between pins 120, 121 and 122 and pins 123, 124 and 125, the operating path of holders 107 and main chassis 103 can be made either the same or different. If the total vertical path is about 5 mm, cartridge 109 can be inserted so that a gap d between cartridge 109 and the top of spindle 106 is provided so that cartridge 109 and spindle 106 do not interfere with each other. As seen in FIG. 4, if the upper path of holder 107 and the downward path of main chassis 103 are the same, while cartridge 109 is being loaded, then each path corresponds to a displacement of $h/2 = 2.5$ mm. This utilizes the displacement amount for the occasions when the entire unit is subjected to vibration or shock. However, this is a temporary condition while the cartridge is being loaded.

During operation when cartridge 109 is completely inserted within holder 107, another detector detects that cartridge 109 has been completely inserted. Lift motor 131 rotates in a reverse direction to that discussed above. This causes movement of belt 133 causing rotation of lift gear 130 in a reverse direction. Rubber vibration insulators 108a rise to position 108c. Main chassis 103, spindle motor 105, and head 104 move upwards in the direction opposite to and towards the descending holder 107. Disk 112 within cartridge 109 is securely clamped to spindle motor 105. As seen in FIG. 2, holder 107, spindle motor 105 and head 104 are positioned at distances $h/2 = 2.5$ mm from reference planes A and B.

In this condition, spindle motor 105 rotates driving a disk 112 which is clamped by spindle motor 105. Head 104 moves along guide rails 115 in the radial direction of disk 112 performing seek operations and conventional read and write operations. If the data storage device is subjected to external vibration or shock during the write or read operation, mounting frame 101 may shake. However, since the collars of rubber vibration insulators 108a are pressed against mounting frame 101 as well as to main chassis 103 through the action of the threaded portions of lift gears 130, and there is a little bit of play between cylinders 108e fixed on the outside of rubber vibration insulators 108a and the cylinder guides of mounting frame 101, rubber vibration insulators 108a dampen the vibration or shock and prevent such strong vibration or shock from being transmitted to main chassis 103. Therefore, these vibrations and shocks do not adversely affect the precision components such as spindle motor 105 and head 104. Due to vibration or shock, spindle motor 105 and head 104 may shake vertically or horizontally within the range of h/2 which equals 2.5 mm. However, this displacement has already been set as the space between holder 107 and plane A and spindle motor 105 and head 104 and reference plane B of the standard storage device height. Therefore, there is no adverse effect due to the vibration insulation action.

To eject cartridge 109, an eject button is pressed causing lift motor 131 to again rotate in a forward direction. Rubber vibration insulators 108a move downwards to position 108aa (FIG. 3). Main chassis 103, spindle motor 105 and head 104 mounted on main Chassis 103 move down. This operation causes the parallel configuration of linkage levers 110 to raise holder 107 to position 107b separating spindle 106 from cartridge 109 by a gap d. Cartridge 109 is ejected from the data storage device. Upon completion of ejection, a detection switch causes lift motor 131 to again drive in a reverse direction raising rubber vibration insulators 108a to position 108c. This returns holder 107 and main chassis 103 to the position shown in FIG. 2. In this position, the main power source is turned off. Even if the data storage device of the personal computer in which it is installed is to be subjected to vibration or shock during transport, spindle motor 105 and head 104 are separated from data storage device height reference planes A, B by an optimum distance $h/2=2.5$ mm. Accordingly, they will not strike any components of the host unit thus avoiding damage.

The above embodiment was a working example of the invention and man other applications utilizing the basic structure above are also contemplated. By way of example, the raising and lowering of main chassis 103 is not limited to a configuration in which vibration insulators 108a engage threaded lift gears 130. It is also contemplated that vibration insulators 108a may engage a commonly used cam or lever. Additionally, the configuration in which holder 107 moves up and down is not limited to the parallel link configuration. It is also contemplated to use a cam configuration, lever configuration or threaded configuration in which holder 107 engages the threaded part of lift gears 130. Additionally, in the described embodiment, linkage levers 110 are attached to mounting frame 101 by pins 121, 124 serving as centers of rotation. However, another configuration may be used in which a second mounting frame corresponding to main chassis 103 is secured to mounting frame 101 through a vibration insulator 108a, linkage levers 110 are linked to a second mounting frame through pins 121, 124 and the ends of the linkage levers are linked by pins 120, 122 and 123, 125 to holder 107 and main chassis 103 which move up or down when Cartridge 109 is inserted or rejected and are displaced relative to the second mounting frame which does not move up and down. Additionally, when main chassis 103 is displaced in the above example, rubber vibration insulators 108a are displaced against mounting frame 101 by sliding. However, the invention is not limited to such a configuration. For example, a configuration can be used in which rubber vibration insulators 108a flex against mounting frame 101. It is possible to cause main chassis 103 to operate and displace holder 107 by means of this flexing of rubber vibration insulators 108a.

Figure 6:
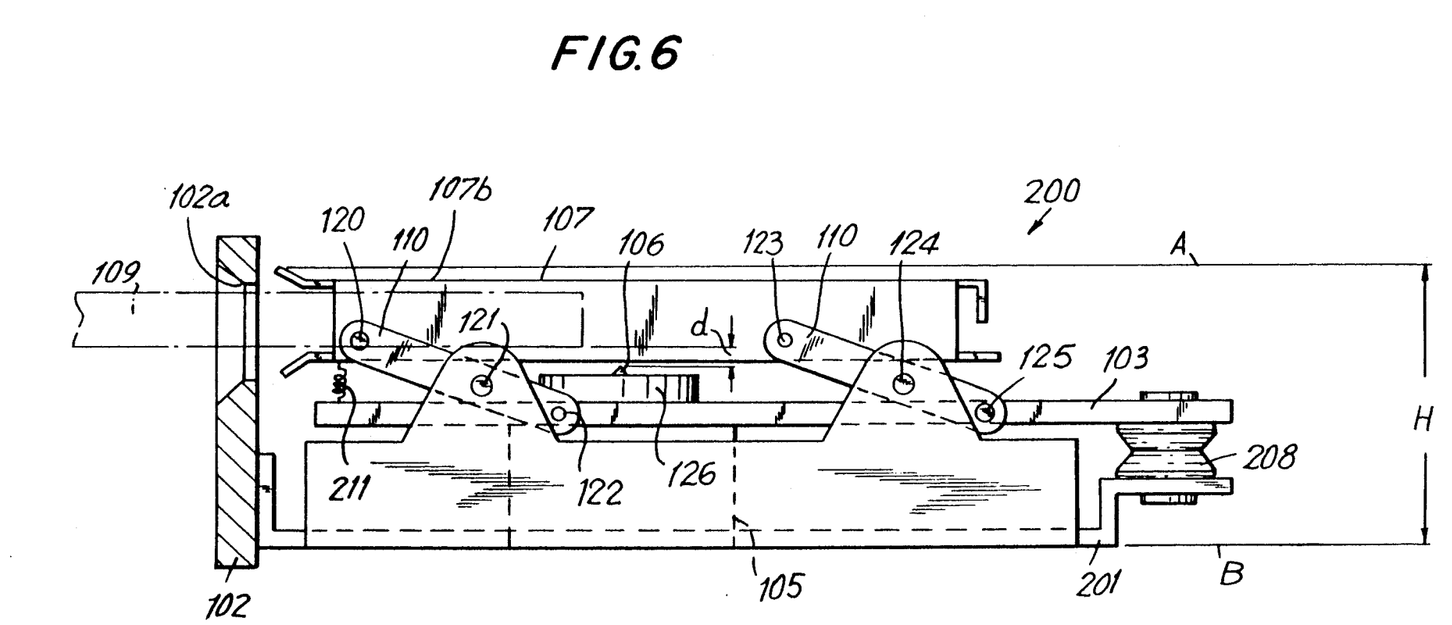
FIG. 6 is a cross-sectional view of a loading mechanism for a data storage device constructed in accordance with a second embodiment of the invention.
Figure 7:
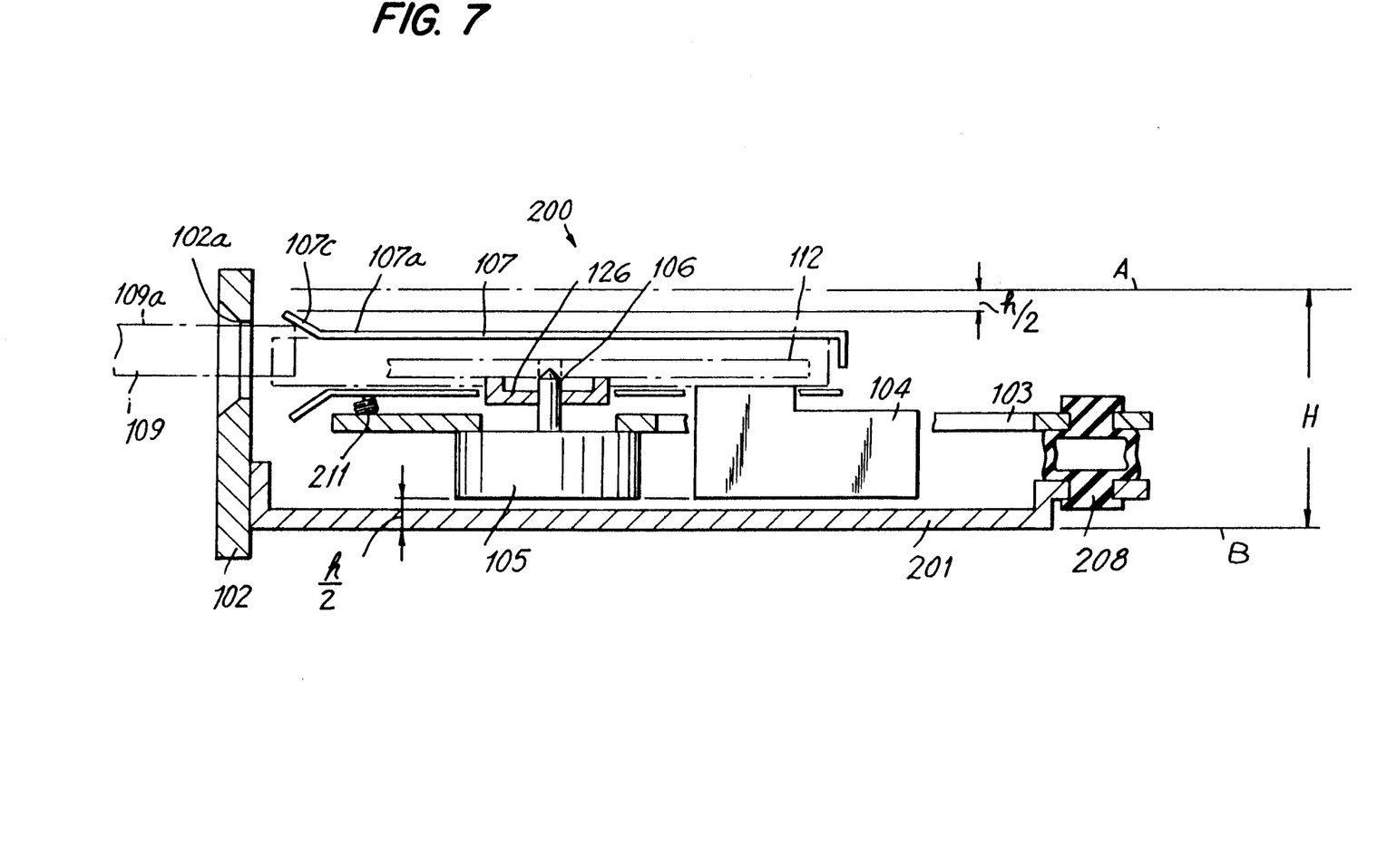
FIG. 7 is a sectional view of a loading mechanism of FIG. 6 showing a cartridge completely inserted in the data storage device.

Reference is now made to FIGS. 6 and 7, wherein a loading mechanism, generally indicated as 200 constructed in accordance with a second embodiment of the invention is provided. Like elements are indicated by like numerals, the difference being the construction of rubber vibration insulators 208.

Loading mechanisms for a data storage device 200 provides a mounting frame 201, main chassis 103 and holder 107. Linkage levers 110 are coupled to main chassis 103, holder 107 and mounting frame 201. A rubber vibration insulator 208 couples mounting frame 201 to main chassis 103 and provides a relatively downward pull on main chassis 103. Additionally, a coil spring 211 couples main chassis 103 to holder 107 and biasing holder 107 towards main chassis 103.

During operation when a cartridge 109 is inserted into the data storage device from a position 109a, the leading edge of cartridge 109 comes in contact with inclined surface 107c of holder 107. The force with which cartridge 109 is inserted, causes holder 107 to rise from position 107a to position 107b (FIG. 6). This operation causes linkage levers 110 to rotate about their respective centers of rotation at pins 121, 124. This causes linkage levers 110 and its rotation about pins 122, 125 to lower main chassis 103, spindle motor 105 and head 104. This is accomplished through a conventional parallel linked configuration and it is achieved through displacement resulting from flexing of rubber vibration insulators 208.

By providing an appropriate distance between pins 120, 121 and 122 and pins 123, 124 and 125, the operational path of holder 107 and main chassis 103 can either be made the same or different. B making the entire length of the vertical path about 5 mm, cartridge 109 can be inserted so there is a gap d between cartridge 109 and the top of spindle 106 so that the cartridge 109 and the top of spindle 106 will not interfere with each other during insertion.

When holder 107 rises and main chassis 103 moves down and their paths are equal, then each is displaced by a distance $h/2=2.5$ mm utilizing the full standard height H of the data storage device. Accordingly there is no space for the vibration shock displacement path $h/2=2.5$ mm. This is only a temporary condition as cartridge 109 is inserted. Once cartridge 109 is completely inserted within holder 107, the force to raise holder 107 no longer exists when cartridge 109 is inserted, so holder 107 and main chassis 103 are automatically returned to their initial positions shown in FIG. 7 by the action of coil spring 211 and rubber vibration insulator 208. In this position, rubber vibration insulators 208 are stretched. Disk 112 within cartridge 109 is securely clamped to spindle motor 105. The distance from holder 107 to reference plane A and the distance between spindle motor 105 or head 104 to reference plane B is set at $h/2=2.5$ mm. Spindle motor 105 rotates and disk 112 clamped to spindle motor 105 is driven. Furthermore, head 104 performs seek operations in the radial direction of disk 112 along guide rails 115 performs write and read operations in accordance with methods known in the art.

If external vibrations or shock are applied during a read or write operation, mounting frame 201 may shake. However, vibration or shock is dampened by rubber insulators 208 and thus prevented from being transmitted to main chassis 103, protecting the precision of spindle motor 105 and head 104 from adverse effects. The vibration or shock may cause spindle motor 105 and head 104 to shake vertically or horizontally within a range of $h/2=2.5$ mm, but as discussed above, the displacement has been set as the distance between holder 107 and the standard data storage device height reference plane A as well as the distance between spindle motor 105 and head 104 and the standard storage device height reference plane B so that the vibration insulation is not affected.

To eject cartridge 109, an ejection button is pressed, holder 107 is caused to rise to position 107b by a method well known in the art. This causes main chassis 103 and the devices mounted thereon such as spindle motor 105 and head 104 to move downwards due to the movement of linkage levers 110 about pins 121 and 122 and 124 and 125. This results in cartridge 109 being separated from spindle 106 by a gap d and the ejection of cartridge 109 from the data storage device. Upon completion of ejection, holder 107 and main chassis 103 are returned to the positions shown in FIG. 7 by the action of coil spring 211. Spindle motor 107 and head 104 will not be damaged by striking components of the personal computer.

The above embodiments utilize a rubber vibration insulator positioned between the mounting frame and the chassis. However, the invention need not be so limited as the rubber vibration insulator may also be positioned between the mounting frame and the holder. The raising and lowering of the main chassis is implemented or non-implemented as required. To achieve the same effect as the present invention, the holder 107 and spindle 106 must be displaced relative to each other during insertion and ejection of the cartridge. More particularly, the two must be displaced in opposite directions to each other to provide a gap d between the cartridge and the spindle.

A geared belt 133 was also utilized in the first embodiment. However, the invention is not limited to such a belt, as a belt without gears may also be utilized. In the first embodiment, lift gear 130 is engaged with belt 133 and the belt is engaged with lift motor 131 to automatically provide raising and lowering actions. However, to reduce cost, it is contemplated that an embodiment utilizing no lift motor can be implemented whereby belt 133 comes in direct contact with the cartridge 109 when it is inserted or rejected and the insertion and ejection of the cartridge causes the lift gears 130 to rotate.

In the first embodiment, the rotation support point of linkage levers 110 were attached directly to a mounting member of the mounting frame. However, where required for vibration insulation, a configuration may also be utilized in which a vibration insulator made of rubber or the like is used about pins 121, 124 or pins 120, 122, 123 and 125 so that an additional rubber or other cushioning material is used between the above mentioned pins and linkage lever 110.

Reference is now made to FIGS. 8–12 in which a loading mechanism for a data storage device, generally indicated as 300 and constructed in accordance with a third embodiment of the invention is provided. Like numbers are utilized to indicate like structure, the substantial difference between loading mechanism for a data storage device 300 and mechanisms 200 and 100 is the utilization of vibration insulators between the levers and the mounting frame.

Figure 8:
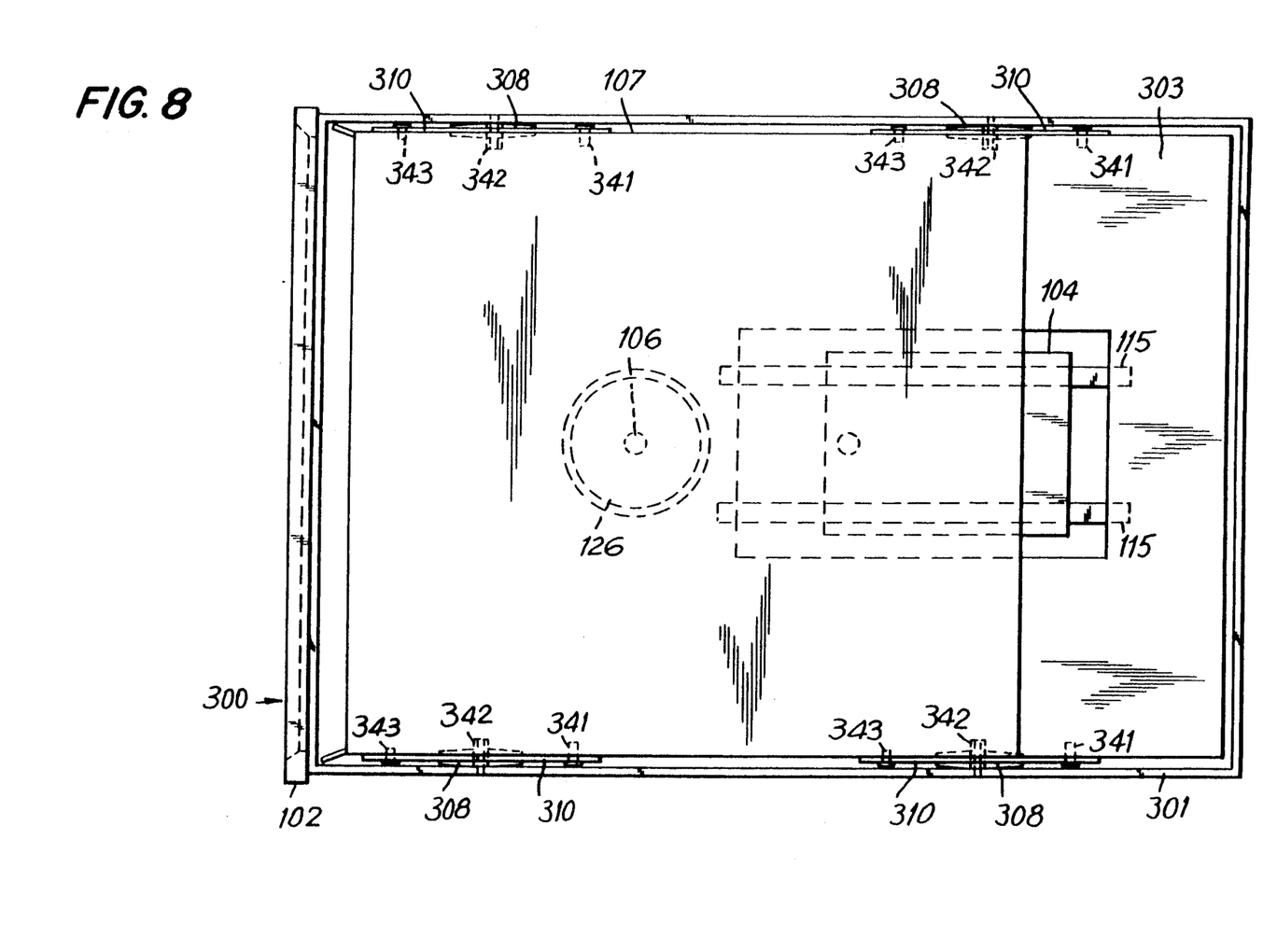
FIG. 8 is a top plan view of a loading mechanism for a data storage device constructed in accordance with a third embodiment of the invention.
Figure 9:
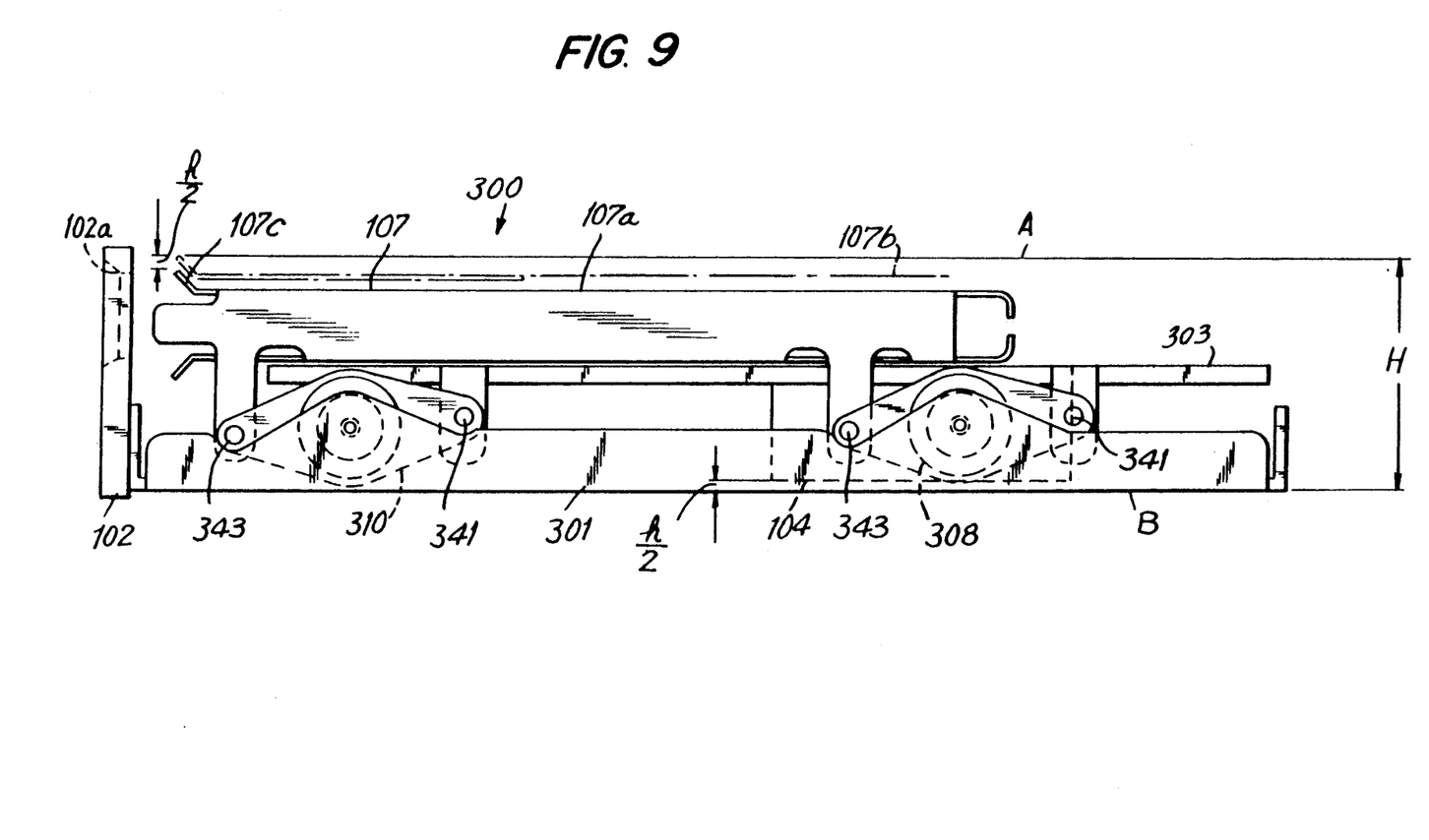
FIG. 9 is a side elevational view of the loading mechanism for a data storage device constructed in accordance with the third embodiment of the invention.

Loading mechanism 300 includes a mounting frame 301. A main chassis 303 and a holder 107 are both mounted to mounting frame 301 by a plurality of linkage levers 310. In an exemplary embodiment, four linkage levers 310 are provided.

Figure 10A:
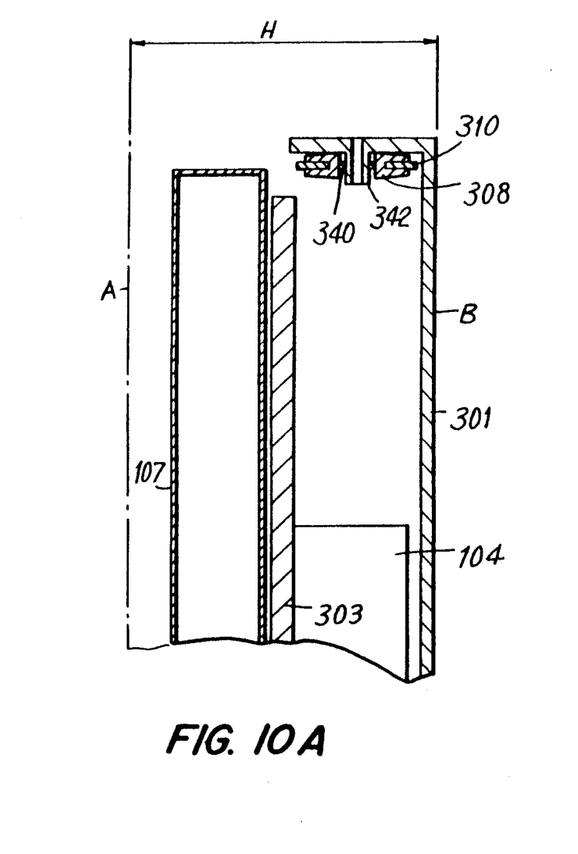
FIG. 10A is an enlarged partial sectional view of a loading mechanism for a data storage device constructed in accordance with the third embodiment of the invention.
Figure 10B:
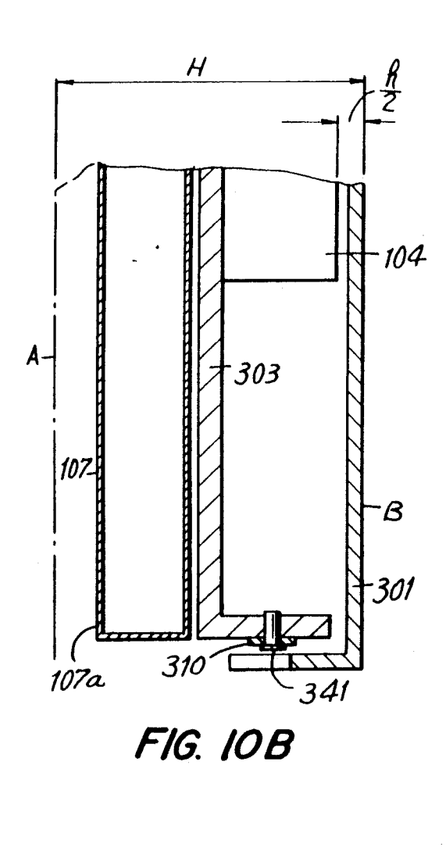
FIG. 10B is an enlarged partial sectional view of a loading mechanism for a data storage device constructed in accordance with the third embodiment of the invention.
Figure 11:
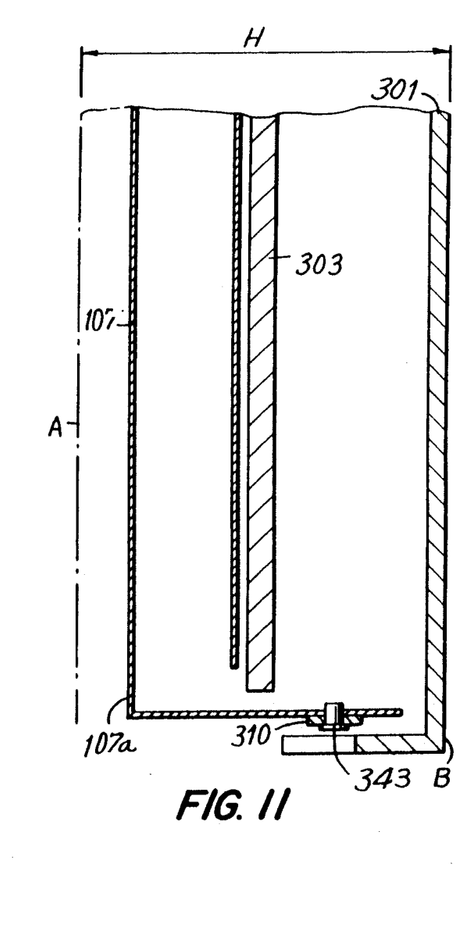
FIG. 11 is a partial enlarged sectional view of a loading mechanism for a data storage device constructed in accordance with the third embodiment of the invention.
Figure 12:
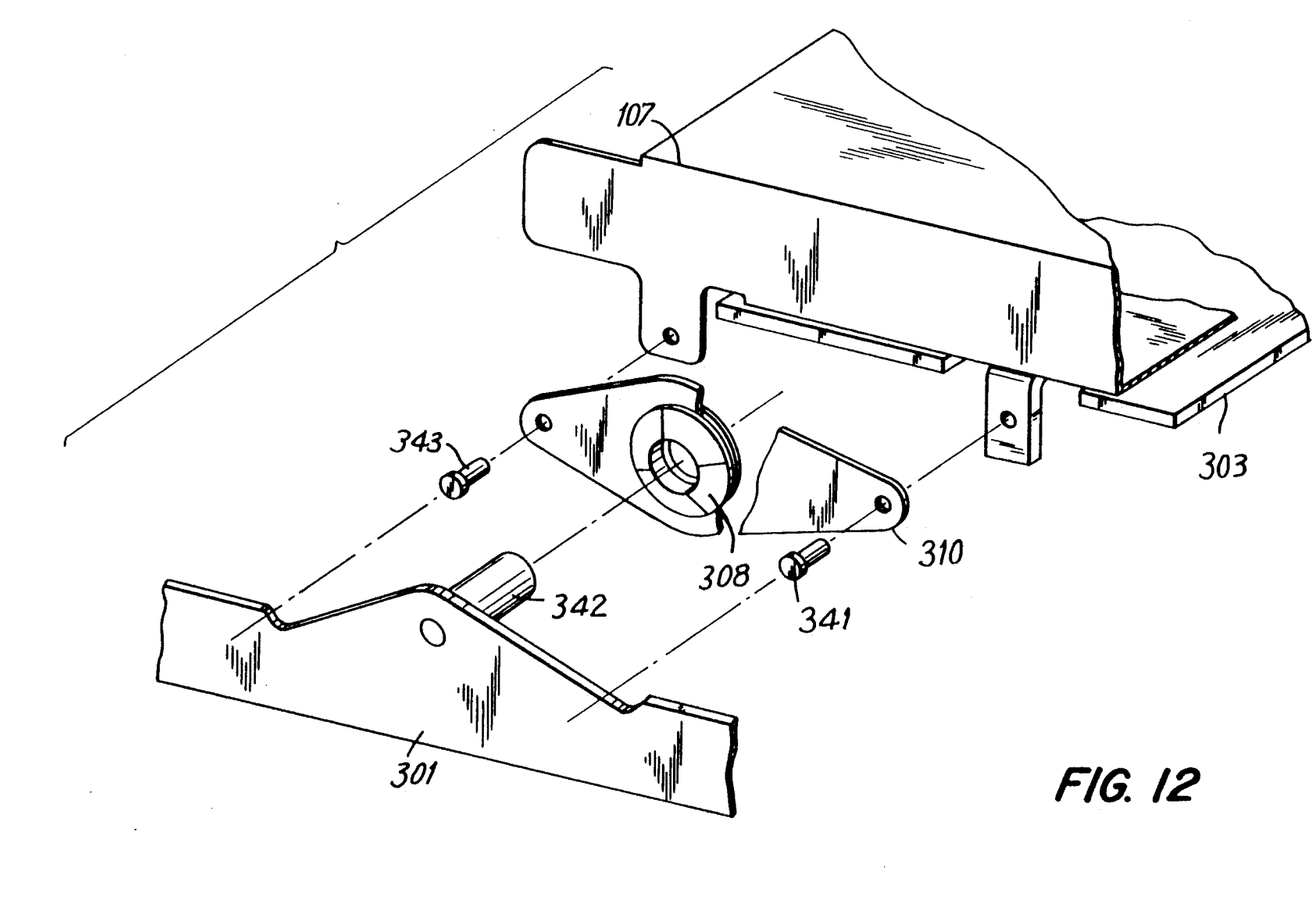
FIG. 12 is an exploded view of a linkage lever constructed in accordance with the third embodiment of the invention.

Mounting frame 301 is provided with cylinders 342 extending therefrom. Linkage levers 310 are mounted about cylinders 342 so that linkage levers 310 rotate about cylinders 342 when main chassis 303 and holder 107 move in an up-down direction. Rubber vibration insulators 308 which serve as vibration insulators are inserted at the rotation support points of linkage levers 310. Rubber vibration insulators 308 are formed in a generally ring like shape having a hollow center. Rings 340 are inserted within the centers of rubber vibration insulating means 308 as seen in FIG. 10A and over cylinders 342. One end of linkage levers 310 is connected to main chassis 303 by a pin 341 as seen in FIG. 10B so that linkage lever 310 may rotate about pins 341. The opposite ends of linkage levers 310 are connected to holder 107 in a similar rotating manner.

Loading mechanism 300 for a data storage device provides rubber vibration insulators 308 at the points of support of rotation of linkage lever 310. This eliminates the need for rubber vibration insulators 308 to slide or flex against mounting frame 301 when main chassis 303 and holder 107 move up and down. Rubber vibration insulators 308 need only flex for dampening when the vibration or shock is applied. Again, the amount of displacement for each means during dampening is within the range h/2 as described above. The raising and lowering movements of chassis 303 and holder 107 are performed by rotating linkage levers 310 about cylinder 342. Head 104 and holder 107 move vertically within a range of h/2 and gap d is maintained between spindle 106 and cartridge 109 so that the cartridge can be loaded and ejected smoothly.

In each of the above embodiments, when the cartridge is inserted or ejected, the chassis on which the spindle motor is mounted is lowered temporarily relative to the mounting frame which serves as a mounting member. At the same time, holder 107 serving as a storage member for the cartridge rises relative to the mounting member so that a gap d is provided between the cartridge and spindle. Interference between the cartridge and spindle is prevented. When the cartridge is not inserted and the power is off or during operation of the data storage device, the holder, spindle motor and head are each positioned so they may keep a distance $h/2 = 2.5$ mm from the standard storage device reference planes so that if the data storage device is subjected to vibration or shock, these elements will not move beyond the referenced planes and strike or damage any component parts of the host unit in which the data storage device is installed.

Additionally, in the embodiment utilizing a belt positioned around the periphery of the mounting frame, the belt does not overlap the motor and head in the middle of the data storage device. Therefore, whether or not shock is applied to the data storage device, these elements will not interfere with each other and the data storage device can be made thinner. Further, the holder and spindle are displaced in opposite directions to each other when the cartridge is inserted and ejected so that the holder, spindle motor and head are positioned separately from the referenced planes of the standard data storage device height by the same distance $h/2 = 2.5$ mm. If the data storage device is subjected to vibration or shock during transportation or operation, the vibration or shock is dampened by the flexing of rubber vibration insulators within the h/2 clearance, thus preventing damage to the data storage device or its misoperation.

By utilizing an embodiment in which the holders are displaced in this manner, drive space is more effectively utilized particularly with respect to height and the wasted space seen in prior art devices is eliminated. This space can thus be distributed to the cartridge, spindle motor and head or other components, thus permitting more reliable design of these members and raising their reliability of the data storage device.

In the first embodiment, cylinders are utilized about the outside of the rubber vibration insulators. The insulators fit within cylindrical guides provided within the mounting frame where they can slide so that the sliding parts have little friction providing excellent durability. By using rings within the rubber vibration insulators in a third embodiment, the rotation of the linkage levers is smooth and again the two parts exhibit high durability.

By providing a loading mechanism for data storage device in which the holder and the main chassis are moved away from each other when the cartridge is inserted or ejected, each moving a distance of h/2 and the holder being linked to the m in chassis by linkage levers, the total of the up movement path and down movement path of the holder and chassis is about 5 mm, and the cartridge and spindle motor do not interfere with each other during operation. Further, regardless of the operating state of the storage device, the minimum required distance is h/2=2~3 mm from the above mentioned standard data storage device height reference points, therefore there is no wasted space as in the prior art data storage devices. This space can be utilized by the spindle motor, head, cartridge thus contributing to higher reliability of these important components.

Where a belt is used as well as four rubber vibration insulators as the vibration insulation means, if the belt is positioned near these four vibration insulators, it would overlap with the spindle motor, head and other components located near the middle of the device and add height restricting the height of these important components. By providing a belt mounted about the periphery of the mounting frame and main chassis of the data storage device, no such restriction is imposed on these components.

By providing a vibration insulation material arranged within the linkage levers, there is no need to displace the vibration insulation material during raising and lowering of the chassis and holder thus simplifying the overall configuration of the device.

It will thus be seen that the objects set forth above, among those made apparent from the preceding description are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A loading mechanism for a data storage device, the data storage device being housed in a cartridge, the loading mechanism comprising a mounting frame, holding means mounted on said mounting frame for receiving and maintaining said cartridge, a chassis mounted on said mounting frame and a plurality of linkage levers, each of said linkage levers having a center of rotation, a first end and a second end and being rotatably coupled to said mounting frame at said center of rotation, rotatably coupled to said holding means at said first end and rotatably coupled to said chassis at said second end, so that when said cartridge is loaded, said holding means and said chassis are displaced towards each other.

2. The loading mechanism of claim 1, further comprising a head and a spindle motor, said head and said spindle motor being mounted on said chassis, the height of said loading mechanism being a standard height H defined by a standard upper reference plane A and a standard lower reference plane B and said spindle motor and said head being a distance h/2 from said plane B and said holding means being said distance h/2 from said plane A after said cartridge has been received by said holding means and said holding means and said chassis moved in a direction opposite to each other.

3. The loading mechanism of claim 2, wherein h/2 equals about 2.5 mm.

4. The loading mechanism of claim 1, wherein said chassis and said holder move towards each other relative to the mounting frame.

5. A loading mechanism for a data storage device, the data storage device being housed in a cartridge, the loading mechanism comprising a mounting frame, holding means mounted on said mounting frame for receiving and maintaining said cartridge, a chassis mounted on said mounting frame so that when said cartridge is loaded, said holding means and said chassis are displaced towards each other, and vibration insulation means disposed between said mounting frame and one of said chassis or said holder, driving means including a belt means, said vibration insulation means being raised and lowered by said belt means.

6. The loading mechanism of claim 5, further comprising a plurality of linkage levers, each of said levers having a center of rotation, a first end and a second end and being rotatably coupled to said mounting frame at said center of rotation, rotatably coupled to said holding means at said first end and rotatably coupled to said chassis at said second end.

7. The loading mechanism of claim 5, wherein said vibration insulation means includes a plurality of rubber vibration insulators disposed about the periphery of said mounting frame, said belt means including a single belt for raising and lowering each of said rubber vibration insulators.

8. The loading mechanism of claim 6, wherein said belt means is mounted about the periphery of the main chassis.

9. A loading mechanism for a data storage device, the data storage device being housed in a cartridge, the loading mechanism comprising a mounting frame, holding means mounted on said mounting frame for receiving and maintaining said cartridge, a chassis mounted on said mounting frame so that when said cartridge is loaded, said holding means and said chassis are displaced towards each other, a plurality of linkage levers, each of said linkage levers having a center of rotation, a first end and a second end and being rotatably coupled to said mounting frame at said center of rotation, rotatably coupled to said holding means at said first end and rotatably coupled to said chassis at said second end, and vibration insulation means disposed between said mounting frame and one of said chassis and said holding means for absorbing vibration and shock, said vibration insulation means being displaced when said holding means and said chassis are displaced and driving means for raising said vibration insulation means and lowering said vibration insulation means relative to said mounting frame, said driving means including a belt means, said vibration insulation means being raised and lowered by said belt means.

10. The loading mechanism of claim 9, wherein said belt means is mounted about the periphery of the main chassis.

11. A loading mechanism for a data storage device, the data storage device being housed in a cartridge, the loading mechanism comprising a mounting frame, holding means mounted on said mounting frame for receiving and maintaining said cartridge, a chassis mounted on said mounting frame so that when said cartridge is loaded, said holding means and said chassis are displaced in opposite directions relative to the mounting frame while moving towards each other, and vibration insulator means disposed between said mounting frame and one of said chassis and said holding means for absorbing vibration and shock, said vibration insulator means being displaced when said holding means and said chassis are displaced towards each other.

12. A loading mechanism for a data storage device, the data storage device being housed in a cartridge, the loading mechanism comprising a mounting frame, holding means mounted on said mounting frame for receiving and maintaining said cartridge, a chassis mounted on said mounting frame so that when said cartridge is loaded, said holding means and said chassis are displaced towards each other, a plurality of linkage levers, each of said linkage levers having a center of rotation, a first end and a second end and being rotatably coupled to said mounting frame at said center of rotation, rotatably coupled to aid holding means at said first end and rotatably coupled to said chassis at said second end, and vibration insulation means mounted at the center of rotation of each of said linkage levers, for absorbing vibration and shock.

13. A loading mechanism for a data storage device, the data storage device being housed in a cartridge, the loading mechanism comprising a mounting frame, holding means mounted on said mounting frame for receiving and maintaining said cartridge, a chassis mounted on said mounting frame so that when said cartridge is loaded, said holding means and said chassis are displaced towards each other, a plurality of linkage levers, each of said linkage levers having a center of rotation, a first end and a second end and being rotatably coupled to said mounting frame at said center of rotation, rotatably coupled to said holding means at said first end and rotatably coupled to said chassis at said second end, and vibration insulation means disposed between said mounting frame and one of said chassis and said holding means for absorbing vibration and shock, said vibration insulation means being displaced when said holding means and said chassis are displaced towards each other.

* * * * *